2,978,412

COPOLYMERS OF PHOSPHORUS SULFIDES AND UNSATURATED ORGANIC ESTERS

Donald A. Guthrie and Carroll L. Knapp, Jr., Cranford, N.J., assignors to Esso Research and Engineering Company, a corporation of Delaware No Drawing. Filed Sept. 25, 1956, Ser. No. 612,061

7 Claims. (Cl. 252—46.6)

This invention relates to the radiolysis of hydrocarbons and, particularly, to a process for producing phosphosulfurized hydrocarbons, to improved products obtained by this process, and to lubricating compositions containing these products. More particularly, this invention is concerned with the reaction product of a phosphorus sulfide with an unsaturated organic ester containing at least one double-bonded carbon linkage. Such reaction products have utility as detergents, oxidation and corrosion inhibitors, extreme pressure agents, and sludge dispersants—particularly the latter, when used in fuels and lubricants.

This application is a continuation-in-part of "Radiochemical Production of Phosphosulfurized Hydrocarbons," Serial No. 413,478, filed March 1, 1954, by Donald A. Guthrie et al.

In brief compass, this invention proposes a novel composition formed by reacting an unsaturated ester, which can be obtained, for example, from an organic alcohol and an organic acid, with a phosphorus sulfide in the presence of high intensity ionizing radiation, preferably photons, i.e., gamma rays and X-rays. More particularly, the unsaturated ester is of the type RCOOR′, R′OOCRCOOR″ or R″COOR′OOCR wherein R, R′ and R″ are selected from the group consisting of hydrogen and alkyl, alkene, aryl, hydroxyalkyl and cyclic radicals, and wherein at least one of said R members contains a C=C linkage. Preferably, organic alcohols containing from 8 to 18 carbon atoms, and organic acids containing from 2 to 12 carbon atoms are used to form the esters.

It has now been found that unsaturated esters can be copolymerized with a phosphorus sulfide under the influence of high intensity ionizing radiation consisting essentially of gamma rays. So far as known, this reaction will not proceed by more conventional chemical methods. The product obtained is a clear colorless (or slightly yellow), extremely viscous liquid or tacky solid.

A surprising feature of the present invention is that the reaction of the phosphorus sulfide is obtained without any substantial decomposition. This is considered to be unusual.

The unsaturated ester feed stocks of this invention are those materials known to the art that will readily polymerize. The esters can be formed for example by reacting either mono- or polyhydric alcohols with mono- or dibasic organic acids. Preferably the molecular weight of the unsaturated ester used in the process of this invention is in the range of about 150 to about 350 and the ester contains one terminal carbon-carbon double bond.

More particularly, the esters of unsaturated carboxylic acids can be employed, including esters of acrylic or methacrylic acids, e.g. "Lorol"[1] methacrylate, $C_8$ Oxo methacrylate, 2-ethyl hexyl acrylate, or cetyl acrylate.

Esters of alpha-beta unsaturated dicarboxylic acids can be used, such as "Lorol" maleate, "Lorol" fumarate, decyl fumarate, butyl itaconate or octyl aconitate.

Esters of unsaturated monohydric alcohols can be used such as vinyl acetate, vinyl-2-ethyl hexoate, the vinyl ester of coconut acids, diallyl phthalate, allyl isobutyrate or allyl octoate. Mixtures of the unsaturated organic esters can, of course, be reacted. Besides the presence of the principal reactant, i.e., the unsaturated organic ester, the reaction mixture can also contain a substantial proportion of other polymerizable monomers such as octene-1, octadecene, maleic anhydride, styrene, α-methyl styrene and acrylonitrile. These other monomers can be used in the proportion of about 0.02 to 2.0 moles per mole of unsaturated organic ester.

The phosphorus sulfide material used can be any of the sulfides known such as $P_2S_3$, $P_2S_5$, $P_4S_3$, $P_4S_7$, or mixtures thereof. $P_4S_3$ or phosphorus sesquisulfide is generally preferred because of its greater solubility in organic solvents, or in the monomeric materials themselves. In general, about 1.0 to 100 mole percent, based on the unsaturated organic ester of the phosphorus sulfide, is used in the reaction mixture.

The phosphorus sulfide can be admixed directly with the monomeric material, although if its solubility is not too great in the monomeric phase alone, it is much preferred to carry out the reaction in the presence of a mutual solvent. The solvent is preferably relatively immune to the radiation conditions employed. Examples of suitable solvents include carbon disulfide, benzene, toluene and xylene. Mixed solvents known to the art such as light aromatic petroleum distillates and white oils can, of course, be used. When a solvent is used, it can comprise about 20 to 90 wt. percent of the reaction mixture.

The high intensity ionizing radiation of the present invention preferably comprises essentially photons, i.e., gamma rays or X-rays, although it may include charged particle radiation such as alpha and beta radiation. The presence of neutrons in the reaction zone is desirably avoided, and should at least be kept as such a minimum as not to cause undue radioactivity in the product.

The radiation is obtained from any convenient source such as a Van de Graaff accelerator; from waste materials such as spent fuel elements or portions thereof from a nuclear reactor or atomic pile; or from materials especially made radioactive in a nuclear reactor, such as cobalt 60 and europium 152. In this embodiment of the invention, the source is preferably sufficient to give an average radiation intensity in the reaction zone equivalent to at least $10^3$ roentgens per hour (r./hr.) of gamma radiation. The reactants are treated simply and effectively by flowing them past, through, or around the radiation source in suitable conduits or pipes. Batch treatment, for example, in canisters, can of course be used.

---

[1] "Lorol" refers to the alcohol portion of the ester which is derived from a mixture of alcohols obtained by the hydrogenation of coconut oil and sold under the name of "Lorol" alcohols.

A suitably shielded nuclear reactor also can be used to carry out the process of the present invention. The shielding is designed to minimize the neutron flux in the reaction zone. In this embodiment of the invention, the gamma ray flux can be preferably of the value indicated above, and the slow neutron flux in the reaction zone is preferably below $10^8$ neutrons/cm.²/sec. Slow neutrons are those having essentially only thermal energy, i.e., below 100 e.v. A somewhat greater amount of fast neutrons can be tolerated, but the total neutron flux is preferably below $10^9$ neutrons/cm.²/sec. The reactants are exposed to the radiation from the nuclear reactor simply by flowing them in or around the fissionable material in suitable conduits or pipes, or by placing them in a batchwise manner in canisters near the radiation source.

The overall reaction conditions are such that the materials receive at least a dosage of $10^6$ roentgens. This accounts normally for a reaction yield of at least 50 wt. percent based on the unsaturated organic ester.

Liquid phase conditions are preferably maintained and for that reason, the pressure is kept sufficient to maintain substantially liquid phase conditions considering the temperature employed, and ranges from 1 to 50 atmospheres. One important feature of this invention is that this reaction is carried out at relatively mild temperatures, i.e., temperatures below 150° F., and preferably at room temperatures. More specifically, the temperatures employed range from −100 to about 200° F. Because of the mild temperature conditions which are employed, excellent control is obtained and the product has characteristics suitable for use as a lubricating medium, whereas in past attempts to react esters and phosphorus sulfides, normally only extremely viscous dark unsuitable tars have been obtained.

While a wide range of product types and characteristics can be produced by this invention, the preferred oil-soluble product has a Staudinger molecular weight in the range of about 1,000 to 50,000, a sulfur content in the range of 0.1 to 15 wt. percent and a phosphorus content in the range of 0.1 to 15 wt. percent. A characteristic of the product of this invention is that the phosphorus to sulfur ratio is approximately the same as the phosphorus to sulfur ratio in the phosphorus sulfide reactant. This indicates that the phosphorus sulfide reacts without decomposition.

Certain of the products obtained by the method of this invention have shown excellent sludge dispersing properties when used in minor amounts in lubricating oils, and have shown promising viscosity index improving properties.

The invention is further illustrated by the following examples. It is pointed out that these examples will show particularly the preferred product obtained by reacting a phosphorus sulfide with an unsaturated organic ester containing a double-bonded carbon terminal unsaturation. This product has shown unusual properties in tests.

EXAMPLE 1

Under the influence of gamma radiation, copolymers of phosphorus sulfides with methacrylate esters have been prepared. These copolymers are oil soluble and are good lubricating oil sludge dispersants. So far as known, a reaction product of this type cannot be made using conventional chemical initiators.

In this example, $C_8$ oxo-"Lorol" methacrylate, which consisted of 80% of the $C_8$ oxo ester and 20% of the "Lorol" ester of methacrylic acid, was used as the monomer ($C_8$ oxo refers to the alcohol portion of the ester obtained by oxonation of a $C_7$ olefin (propene-butene copolymer) and "Lorol" refers to the alcohol portion of the ester derived by hydrogenation of coconut oil and sold under the name of "Lorol" alcohols). The mixed methacrylate ester, dissolved in a suitable solvent, was reacted both in the presence and absence of $P_4S_3$. About 40 ccs. of the reaction mixture contained in a sealed, brown glass 2 ounce bottle were exposed to gamma radiation from a cobalt 60 source having a rating of about 1,000 curies. The radiation intensity in the reaction zone was 300,000 R/hr. The pressure was substantially atmospheric and the temperature was 74° F. (room temperature). The irradiation was continued until approximately 20 megaroentgens were absorbed by the reactants.

The reaction products, after removal of solvent and washing with isopropanol to remove unreacted phosphorus sulfide, were tested for sludge dispersancy. The results of these tests, and analyses of the polymer are reported in Table I. In the sludge dispersancy test, 10 grams of used oil sludge and 90 grams of a test oil were heated to 185° F. and mixed thoroughly. A seven-inch column of this mixture was placed in a 100 cc. graduate and stored for 24 hours at 200° F. Then, the top 25 ccs. were transferred to a 100 cc. A.S.T.M. centrifuge tube, diluted to 100 cc. with heptane and centrifuged. The volume of solid obtained was recorded and represents the total solids originally suspended in the top 25 cc. of the test oil.

The test oil was a standard refined SAE 10 mineral lubricating oil with a viscosity of about 48 SUS at 210° F. and a V.I. of about 113. To this test oil was added 1.7% of the methacrylate ester copolymers that were to be tested.

Table 1

| System Irradiated | Ester Conversion, Percent | Percent S | Percent P | P/S | Product Inspections | |
|---|---|---|---|---|---|---|
| | | | | | Ratio of Ester to $P_4S_3$ | Sludge Dispersancy Test, Vol. Percent |
| 30% Methacrylate in Benzene | 72 | | | | | |
| 30% Methacrylate in $CS_2$ | 50 | | | | | 15 |
| 30% Methacrylate, 2.3% $P_4S_3$ in Benzene | 29 | 0.28 | 0.236 | 0.84 | 201/1 | 45 |
| 30% Methacrylate, 8.8% $P_4S_3$ in $CS_2$ | 26 | 2.01 | 2.53 | 1.26 | 22/1 | ¹ 150 |

¹ High value probably due to precipitation of both additive and sludge on addition of hexane at the end of the test. Suggests very strong association of additive and sludge.

It is seen that the irradiation in either benzene or $CS_2$ gave good conversions to products which contain 22 to 201 ester units per $P_4S_3$ molecule. This was determined after removal of the solvent, washing with isopropanol and making a phosphorus and sulfide analysis. The results of the sludge dispersancy tests show that a useful lubricating oil sludge dispersant can be prepared according to the teachings of the invention.

EXAMPLE 2

In further experiments, phosphorus sulfides were reacted with different unsaturated organic esters and mixtures of the esters with other types of polymerizable monomers. The conditions and manner of treatment were the same as in Example 1, with the exception of the radiation dosage and the use of a 3,000 curie cobalt 60 source. The copolymers obtained were isolated by evaporation of the solvents, and were freed from excess phosphorus sulfides by washing with isopropanol. The products were evaluated by the sludge dispersancy test previously described and blended in the test oil also described in Example 1. In this case, 3 wt. percent of the polymer was used in the test oil or base stock. The results are listed in Table II.

Table II

| Run No. | Composition of System Irradiated (wt. Percent) | | | | Radiation Dose (Megaroentgens) | Monomer Conversion (percent) | Percent P | Percent S | Percent P/Percent S | Mole Ratio of Monomer/$P_4S_3$ or $P_2S_5$ [1] | Blends in Base Stock (3 wt. percent polymer) | | |
|---|---|---|---|---|---|---|---|---|---|---|---|---|---|
| | Lauryl Methacrylate | $P_4S_3$ | $P_2S_5$ | Solvent | | | | | | | Viscosity (210° F. SUS) | V.I. | Dry Used Oil Sludge Dispersancy Test (Vol. Percent Sludge Suspended) |
| 1 | 30 | | 1.25 | $CS_2$ | 21 | 43 | 0.59 | 2.64 | 0.223 | | 51.1 | 120.3 | |
| 2 | 30 | | 1.25 | $CS_2$ | 39 | 51 | 0.60 | 3.09 | 0.194 | | 51.0 | 120.1 | |
| 3 | 30 | 8.1 | | $CS_2$ | 20 | 95 | 1.66 | 1.76 | 0.94 | 28/1 | 53.1 | 125.1 | 80 |
| 4 | 30 | 8.1 | | $CS_2$ | 35 | 93 | 2.37 | 1.79 | 1.32 | | 52.5 | 124.0 | |
| 5 | 30 | 4.0 | | $CS_2$ | 20 | 90 | 1.54 | 1.67 | 0.92 | 31/1 | 53.0 | 125.6 | 70 |
| 6 | 30 | 2.0 | | $CS_2$ | 20 | 93 | 1.44 | 1.54 | 0.94 | 33/1 | 53.2 | 125.8 | 70 |
| 7 | 30 | 0.5 | | $CS_2$ | 20 | 94 | 0.40 | 0.33 | 1.21 | 121/1 | 54.9 | 127.4 | 75 |
| 8 | 30 | | | $CS_2$ | 20 | 51 | | | | | 54.2 | 126.7 | 10 |
| | | | | | | | | | | Base Oil | 47.9 | 113.0 | 5–10 |
| | Vinyl-2-Ethyl-Hexoate | | | | | | | | | | | | |
| 9 | 30 | 4.0 | | $CS_2$ | 20 | 8 | 10.47 | 10.43 | 1.00 | 5/1 | | | |
| 10 | 30 | 1.0 | | $CS_2$ | 20 | 12 | 9.52 | 10.02 | 0.95 | 5/1 | | | |
| 11 | 30 | 1.0 | | $CS_2$ | 39 | 37 | 5.42 | 7.45 | 0.73 | 9/1 | [2] 47.9 | [2] 114.4 | |
| 12 | 30 | | | $CS_2$ | 20 | 22 | | | | | | | |
| 13 | 30 | | | $CS_2$ | 39 | 38 | | | | | 48.5 | 113.0 | |
| | 80/20 Decyl Fumarate/Styrene | | | | | | | | | | | | |
| 14 | 30 | 4.0 | | $CS_2$ | 20 | | 2.53 | 1.93 | 1.31 | | 50.1 | 118.0 | |
| 15 | 30 | 1.0 | | $CS_2$ | 20 | | 1.39 | 1.15 | 1.21 | 21/1 | 50.1 | 118.0 | |
| 16 | 30 | 1.0 | | $CS_2$ | 39 | | 1.60 | 1.59 | 1.00 | 17/1 | 50.4 | 119.0 | |
| 17 | 30 | | | $CS_2$ | 20 | | | | | | 50.8 | 120.2 | |
| 18 | 30 | | | $CS_2$ | 40 | | | | | | 50.8 | 120.0 | |

[1] Determined by P & S analyses. Percent P/Percent S ratio of $P_4S_3$ used was 1.067, and of $P_2S_5$ was 0.388. Monomer/Sulfide ratio calculated only where product P/S was about the same as original $P_4S_3$ or $P_2S_5$.
[2] 0.65% polymer in base stock.

These data show that the phosphorus sulfide copolymers prepared by irradiation of the lauryl methacrylate solutions containing varied amounts of added phosphorus sulfide, demonstrated excellent sludge dispersant activity without imparing the good viscosity index improving properties which were observed for the homopolymer of lauryl methacrylate prepared using irradiation in the absence of phosphorus sulfide. For example, the viscosity index of 3% blends of these copolymers in the base stock ranged from 125 to 127. These values are to be compared to a V.I. of only 113 for the base oil, and 127 for a lauryl methacrylate polymer prepared by irradiation under the same conditions in the absence of a phosphorus sulfide.

The exact manner in which the phosphorus sulfide is incorporated into the polymer chain by radiation is not known at this time. Because, however, the ratio of phosphorus to sulfur in the product is substantially identical to that of the phosphorus sulfide reactant, it appears that the sulfide combined with the ester without decomposition. The product composition can be varied, of course, by changing the ratio of sulfide to ester and/or by carrying out the reaction in different solvents.

These phosphorus sulfide copolymers, while having other uses, represent a new class of lubricating additives. Besides the above demonstrated qualities, they have other good product quality characteristics such as stability, and compatibility with other lubricant additives.

When additives of the present invention are employed in lubricating oils, they are preferably added in proportions of about 0.01 to about 20.0% or more, preferably about 0.5 to 10.0%, and more preferably about 1.0 to 6.0%, by weight. The proportions giving the best results will vary somewhat according to the nature of the additive, the nature of the lubricating oil base stock to which it is added, and the specific purpose which the lubricant is to serve in a given case. For commercial purposes, it is convenient to prepare concentrated oil solutions in which the amount of additive in the composition ranges from 25% to 50% by weight, and to transport and store them in such form. In preparing a lubricating oil composition for use as a crankcase lubricant, the additive concentrate is merely blended with the base oil in the required amount.

The products of the present invention can be employed not only in ordinary hydrocarbon lubricating oils, but also in the "heavy duty" type of lubricating oils which have been compounded with such detergent type additives as metal soaps, metal petroleum sulfonates, metal phenates, metal alcoholates, metal alkyl phenol sulfides, metal organo phosphates, thiophosphates, phosphites and thiophosphites, metal salicylates, metal xanthates and thioxanthates, metal thiocarbamates, amines and amine derivatives, reaction products of metal phenates and sulfur, reaction products of metal phenates and phosphorus sulfides, metal phenol sulfonates and the like. Thus the additives of the present invention can be used in lubricating oils containing such other addition agents as barium tert.-octyl-phenol sulfide, calcium tert.-amylphenol sulfide, nickel oleate, barium octadecylate, calcium phenyl stearate, zinc diisopropyl salicylate, aluminum naphthenate, calcium cetyl phosphate, barium di-tert.-amylphenol sulfide, calcium petroleum sulfonate, zinc methylcyclohexyl thiophosphate, calcium dichlorostearate, etc. Other types of additives such as phenols and phenol sulfides can be employed.

The lubricating oil base stocks used in the compositions of this invention may be straight mineral lubricating oils or distillates derived from paraffinic, naphthenic, asphaltic, or mixed base crudes, or, if desired, various blended oils can be employed as well as residuals, particularly those from which asphaltic constituents have been carefully removed. The oils can be refined by conventional methods using acid, alkali and/or clay or other agents such as aluminum chloride, or they can be extracted oils produced, for example, by solvent extraction with solvents of the type of phenol, sulfur dioxide, furfural, dichlorodiethyl ether, nitrobenzene, crotonaldehyde, etc. Hydrogenated oils, white oils, or shale oil can be employed as well as synthetic oils, such as esters and polyethers as well as those prepared, for example, by the polymerization of olefins or by the reaction of oxides of carbon with hydrogen or by the hydrogenation of coal or its products. Also, for special applications, animal, vegetable or fish oils or their hydrogenated or voltolized products can be employed in admixture with mineral oils.

Synthetic lubricating oils can also be employed which have a viscosity of at least 30 S.U.S. at 100° F. such as esters of monobasic acids (e.g., ester of $C_8$ oxo alcohol with $C_8$ oxo acid, ester of $C_{13}$ oxo alcohol with octanoic acid, etc.), esters of dibasic acids (e.g., di-2-ethyl hexyl sebacate, di-nonyl adipate, etc.), esters of glycols (e.g., $C_{13}$ oxo acid diester of tetraethylene glycol, etc.), complex esters (e.g., the complex ester formed by reacting one mole of sebacic acid with two moles of tetraethylene glycol and two moles of 2-ethyl-hexanoic acid, complex ester formed by reacting one mole of tetraethylene glycol with two moles of sebacic acid and two moles of 2-ethyl hexanol, complex ester formed by reacting together one mole of azelaic acid, one mole of tetraethylene glycol, one mole of $C_8$ oxo alcohol, and one mole of $C_8$ oxo acid), esters of phosphoric acid (e,g,, the ester formed by contacting three moles of the monomethyl ether of ethylene glycol with one mole of phosphorus oxychloride, etc.), halocarbon oils (e.g., the polymer of chlorotrifluoroethylene containing twelve recurring units of chlorotrifluoroethylene), alkyl silicates (e.g., methyl polysiloxanes, ethyl polysiloxanes, methyl-phenyl polysiloxanes, ethyl-phenyl polysiloxanes, etc.), sulfite esters (e.g., ester formed by reacting one mole of sulfur oxychloride with two moles of the methyl ether of ethylene glycol, etc.), carbonates (e.g., the carbonate formed by reacting $C_8$ oxo alcohol with ethyl carbonate to form a half ester and reacting this half ester with tetraethylene glycol), mercaptals (e.g., the mercaptal formed by reacting 2-ethyl hexyl mercaptan with formaldehyde), formals (e.g., the formal formed by reacting $C_{13}$ oxo alcohol with formaldehyde), polyglycol type synthetic oils (e.g., the compound formed by condensing butyl alcohol with fourteen units of propylene oxide, etc.), or mixtures of any of the above (or with mineral oils), in any proportions can also be used.

For the best results the base stock chosen should normally be that oil which, without the new additive present, gives the optimum performance in the service contemplated. However, because one advantage of the additives is that their use also makes feasible the employment of less satisfactory mineral oils or other oils, no strict rule can be laid down for the choice of the base stock. Certain essentials must, of course, be observed. The oil must possess the viscosity and volatility characteristics known to be required for the service contemplated. The oil must be a satisfactory solvent for the additive, although in some cases auxiliary solvent agents may be used. The lubricating oils, however they may have been produced, can vary considerably in viscosity and other properties depending upon the particular use for which they are desired, but they usually range from about 40 to 150 seconds Saybolt viscosity at 210° F. For the lubricating of certain low and medium speed diesel engines, the general practice has often been to use a lubricating oil base stock prepared from naphthenic or aromatic crudes and having a Saybolt viscosity at 210° F. of 45 to 90 seconds and a viscosity index of 0 to 50. However, in certain types of diesel engine and other gasoline engine service, oils of higher viscosity index are often preferred, for example, up to 75 to 100, or even higher, viscosity index.

In addition to the material to be added according to the present invention, other agents can also be used such as dyes, pour depressors, heat thickened fatty oils, sulfurized fatty oils, organo-metallic compounds, metallic or other soaps, sludge dispersers, anti-oxidants, thickeners, viscosity index improvers, oiliness agents, resins, rubber, olefin polymers, voltolized fats, voltolized mineral oils or voltolized waxes and collodial solids such as graphite or zinc oxide, etc. Solvents and assisting agents, such as esters, ketones, alcohols, aldehydes, halogenated or nitrated compounds, and the like may also be employed.

In addition to being employed in lubricants, the additives of the present invention also can be used in motor fuels, hydraulic fluids, torque converter fluids, cutting oils, flushing oils, turbine oils or transformer oils, industrial oils, process oils and generally as detergents, viscosity-index improvers and/or pour depressants in mineral oil products. They also can be used in gear lubricants and greases.

Having described this invention, what is sought to be protected by Letters Pattent is succinctly set forth in the following claims.

What is claimed is:

1. A copolymeric product obtained by exposing an unsaturated organic aliphatic ester of a $C_8$ to $C_{18}$ alcohol and a $C_2$ to $C_{12}$ carboxylic acid, and containing a terminal carbon-carbon double bond, to a dosage of at least $10^6$ roentgens of gamma radiation in the presence of a phosphorus sulfide, the proportion of ester to phosphorus sulfide being 1 mole of ester to in the range of 0.01 to 1.0 mole of phosphorus sulfide.

2. A copolymeric product in accordance with claim 1 wherein the molecular weight of said unsaturated ester is in the range of about 150 to 350.

3. A copolymeric product in accordance with claim 1 wherein said ester and said phosphorus sulfide are exposed to gamma rays in the presence of an additional polymerizable monomer selected from the group consisting of maleic anhydride, styrene alpha-methyl styrene and acrylonitrile, said additional monomer being present in the proportion of about 0.02 to 2.0 moles per mole of unsaturated organic ester.

4. A lubricating oil composition comprising a major amount of lubricating oil and a minor amount of the copolymeric product of claim 1.

5. A lubricant additive concentrate consisting essentially of a hydrocarbon lubricating base oil and 25 to 50 weight percent of the reaction product of claim 1.

6. A copolymeric product having a Staudinger molecular weight in the range of 1,000 to 50,000 containing in the range of 0.1 to 15 weight percent of phosphorus and in the range of 0.1 to 15 weight percent of sulfur, prepared by exposing an unsaturated organic aliphatic ester of a $C_8$ to $C_{18}$ alcohol and a $C_2$ to $C_{12}$ carboxylic acid, and containing a terminal carbon-carbon double bond, to a dosage of at least $10^6$ roentgens of gamma radiation in the presence of a phosphorus sulfide, the proportion of ester to phosphorus sulfide being 1 mole of ester to in the range of 0.01 to 1.0 mole of phosphorus sulfide.

7. A process for preparing a copolymer of a phosphorus sulfide and an unsaturated organic aliphatic ester of a $C_8$ to $C_{18}$ alcohol and a $C_2$ to $C_{12}$ carboxylic acid and containing a terminal carbon-carbon double bond, which comprises exposing said unsaturated organic ester in liquid phase at a temperature below 200° F. to a dosage of at least $10^6$ roentgens of gamma radiation in the presence of phcsphorus sulfide, the proportion of ester to phosphorus sulfide being 1 mole of ester to in the range of 0.01 to 1.0 mole of phosphorus sulfide.

(References on following page)

References Cited in the file of this patent

UNITED STATES PATENTS

| | | |
|---|---|---|
| 2,242,260 | Prutton | May 20, 1941 |
| 2,379,312 | May | June 26, 1945 |
| 2,379,453 | Noland | July 3, 1945 |
| 2,381,907 | Hughes | Aug. 14, 1945 |
| 2,382,775 | Cook | Aug. 14, 1945 |
| 2,424,402 | Loane | July 22, 1947 |
| 2,483,571 | Brennan | Oct. 4, 1949 |
| 2,489,091 | Khorasch | Nov. 22, 1949 |

FOREIGN PATENTS

| | | |
|---|---|---|
| 299,735 | Great Britain | Oct. 30, 1928 |
| 282,370 | Switzerland | Apr. 30, 1952 |